United States Patent

[11] 3,587,304

| | | |
|---|---|---|
| [72] | Inventor | John W. Eckart<br>King, Ontario, Canada |
| [21] | Appl. No. | 803,349 |
| [22] | Filed | Feb. 28, 1969 |
| [45] | Patented | June 28, 1971 |

[54] TORQUE-INDICATING DEVICE
7 Claims, 1 Drawing Fig.

[52] U.S. Cl. .................................................. 73/136,
73/140
[51] Int. Cl. .................................................. G01l 5/12
[50] Field of Search .......................................... 73/140,
136; 177/208; 92/83, 86

[56] References Cited
UNITED STATES PATENTS
| 1,822,628 | 9/1931 | Lincoln .................. | 177/208X |
| 2,386,367 | 8/1945 | Taylor .................. | 73/136X |
| 3,373,603 | 3/1968 | Chapman .................. | 73/140X |

*Primary Examiner*—Jerry W. Myracle
*Attorneys*—Charles M. Hogan and Gary M. Gron ABSTRACT: The disclosure illustrates a torque-indicating device of the type that uses axial reaction force on one of a pair of intermeshing helical gears in an output gear box of an engine to determine the engine's torque output. Lubricating fluid in a chamber is subjected to the axial reaction force and its pressure reflects torque. An important feature of the invention is that the chamber is automatically replenished from the engine lubricating system during certain conditions of operation.

PATENTED JUN28 1971
3,587,304
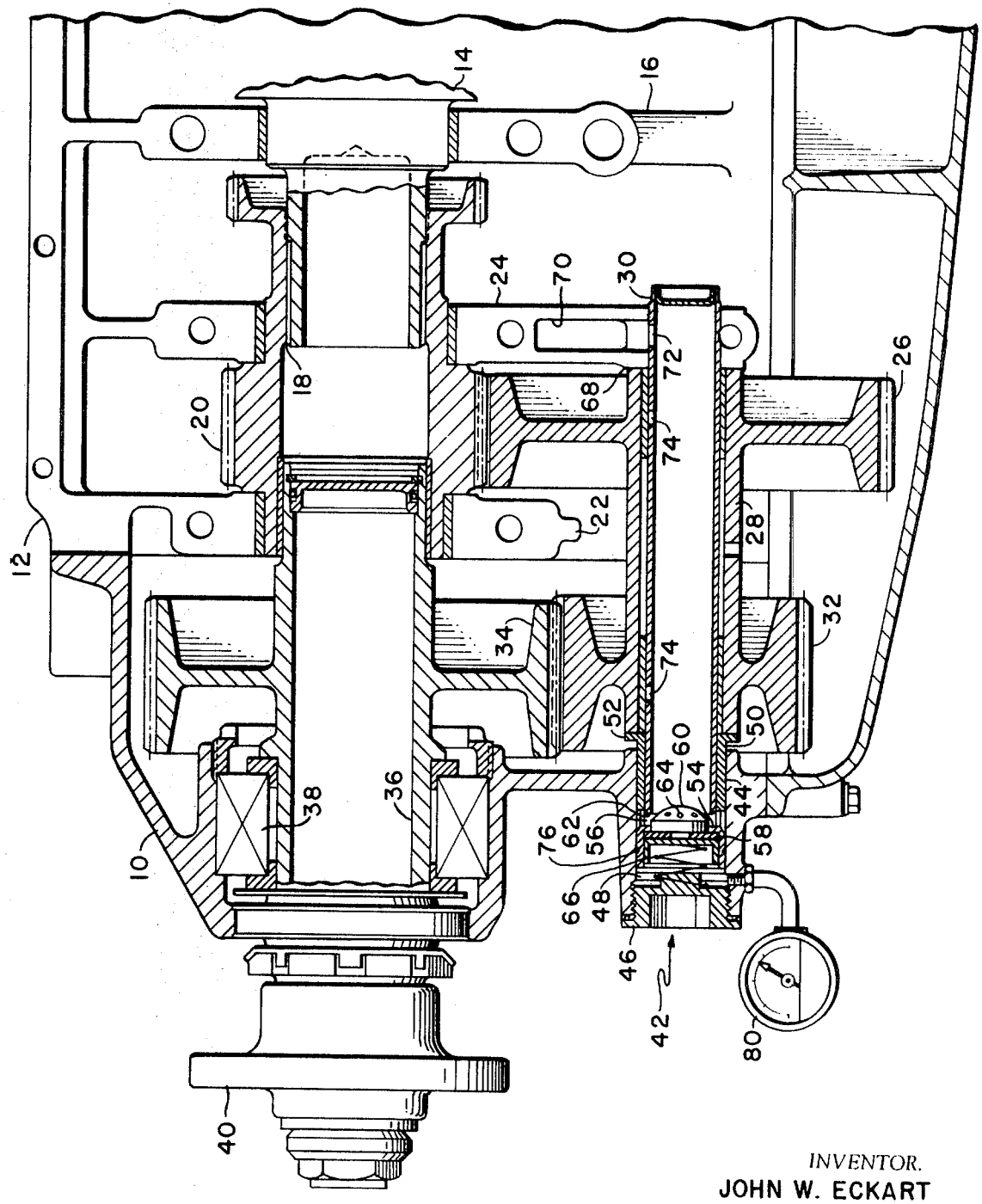
INVENTOR.
JOHN W. ECKART
BY Charles M. Hogan
Gary M. Gron
ATTORNEYS.

TORQUE-INDICATING DEVICE

The present invention relates to torque-indicating devices and more particularly to torque-indicating devices incorporated in internal combustion engines.

It is well-known principle to use the axial reaction force on a movable gear in a helical gear assembly to determine transmitted torque. There are many ways of sensing and indicating this reaction force and each has its own advantages and disadvantages.

One of the well-known approaches is that of merely positioning a fluid-filled flexible element against an axially movable gear. A pressure gauge connected to the element reads the increase in fluid pressure in response to axial movement of the gear. While this approach is adequate to indicate torque transmitted between the gears, it is not suited for long term development of cracks. These cracks permit the fluid leakage which impairs the ability to accurately reflect torque.

A second well-known arrangement for determining torque incorporates a chamber having a flow of fluid therethrough. A valve element responsive to axial movement of a helical gear is used to regulate the flow from the chamber and the pressure therein as a function of torque. While this arrangement is generally effective and eliminates the possibility of running out of a supply of fluid, it requires a rather complex valve mechanism.

Accordingly, it is an object of the present invention to provide a highly effective reliable and simplified torque-indicating device.

The above ends are achieved by providing a torque-indicating device for use with an engine having a pump for pressurizing lubricating fluid and intermeshing first and second bevel gears positioned in an output gear assembly for the engine. The first gear is displaceable relative to the other in response to the torque output of the engine.

The torque-indicating device comprises a means for forming a chamber and a valve element means having an inner side displaceable into the chamber to form in combination therewith a variable volume. The valve element means is displaceable by the first gear in a direction to reduce the chamber volume in a response to an increase in torque. A means is provided for connecting pressurized lubricating fluid from the pump to the outer side of the displaceable valve means. A means is carried by the displaceable valve element means for permitting one-way flow fluid from the outer side of the displaceable valve element means to its inner side. As a result, the chamber is maintained full of fluid so that when the displaceable valve element is urged by the helical gear towards a reduced volume position the fluid pressure in the chamber is proportional to the torque output of the engine. A means responsive to fluid pressure in the chamber is provided for indicating the torque output of the engine.

The above and other related objects and features of the present invention will be apparent from a reading of the description of the disclosure shown in the accompanying drawing and the novelty thereof pointed out in the appended claims.

The single drawing illustrates a longitudinal section view of an output gear assembly for an internal combustion engine embodying the present invention.

Referring particularly to the drawing, an output gear assembly housing 10 is mounted to the forward portion of an engine crankcase 12. A crankshaft 14 is journaled in webs 16 provided in the interior of the crankcase 12 to provide a rotary input to a gear assembly, generally indicated by reference character 15. The forward end of the crankshaft 14 is splined at 18 to interfit with an input helical gear 20. The bevel gear 20 is journaled on either side in crankcase webs 22 and 24. The input gear 20 meshes with a helical gear 26 mounted on the aft end of a lay shaft 28. The lay shaft 28 is tubular in form and is journaled on a tubular element 30 fixed to crankcase web 24. The forward end of the lay shaft 28 has a helical gear 32 which meshes with an output helical gear 34. The output gear 34 is integral with a drive shaft 36 which is journaled at its aft end in the forward portion of helical gear 20 and at its forward end through a suitable antifriction bearing assembly 38. A hub assembly 40 enables connection of the drive shaft to a propeller of an aircraft or to drive wheels of a land vehicle.

The lay shaft 28 is journaled on the tubular shaft 30 in such a manner that it is axially displaceable relative to the gears 34 and 20. These gears and the lay shaft gears 32 and 26 have a pitch that causes the lay shaft to move in a forward direction in response to the axial torque reaction transmitted between the gears. This axial reaction force is used to indicate the output torque of the engine by a torque-indicating device, generally indicated by reference character 42.

The torque-indicating device 42 comprises a bore 44 formed in a forward portion of the gear assembly housing 10 and coaxial with the lay shaft 28. An end cap 46 is threaded into the outer end of the bore 44 to form the bottom wall of a chamber 48. A cylindrical valve element comprising a sleeve 50 is displaceable into the bore 44. The sleeve 50 has a flange 52 on its outer end which abuts the forward end of the lay shaft 28. An inwardly extending flange 54 is formed adjacent the inner end of the sleeve 50. A one-way valve element 56 is received in the interior of the sleeve 50 and has a base 58 which abuts the inner flange 54. A generally hemispherical head portion 60 extends through the flange 54 to an open end 62 of the tubular shaft 30. The head portion 60 has a series of ports 64 which connect the open end of the tubular shaft 30 to the chamber 48. An elastic element (not shown), positioned on the inside of the hemispherical head portion 60, permits one-way flow only from the interior of the tubular shaft 30 to the chamber 48. A spring 66 acts against the cap 56, which forms the bottom wall for the bore 48, and the cylindrical base 58 of the one-way valve 56 to urge the valve 56, the sleeve 50 and the lay shaft 28 to an aft position where the rearward end of the lay shaft 28 abuts the web 24 at a surface 68.

The engine has a lubricating system in which lubricating fluid is pressurized by a pump (not shown) and a system for communicating the pressurized fluid to the gears in the output gear assembly 15. For this purpose a flow path is provided through a passageway 70 and port 72 from the oil pump to the interior of the tubular member 30. Radial ports 74 permit the lubricating fluid to lubricate the lay shaft 28 on the shaft 30.

Pressurized fluid is also applied to the outer side of the one-way valve element 64 through the open end 62 of the shaft 30 and the elastic element permits flow of fluid into the chamber 48. A seal element 76 is provided in the inner end of the sleeve 50 to minimize leakage of the fluid from the chamber 48. Additional radial ports 78 are provided in the sleeve 50 to permit a flow of lubricating fluid between the outer portion of the sleeve 50 and the bore 44.

When the chamber 48 is filled with fluid, movement of the lay shaft 28 in response to an increase in torque acts on the sleeve 50 and the valve element 56 in a direction tending to reduce the volume of chamber 48. Since the chamber 48 is full of fluid the volume is not reduced but the pressure exerted on the fluid is increased. This increase in pressure is sensed by a suitable pressure-indicating device 80 to provide an output indication directly proportional to the torque transmitted by the engine.

The above operation is described for normal operating conditions of an engine wherein the fluid pressure in chamber 48 caused by the torque reaction of the gears is higher than the lubricating fluid supply pressure. When the engine shuts down the gear torque reaction is reduced to zero and the spring 66 urges the sleeve 50 to an aft position wherein the chamber volume 48 is a maximum. When the engine subsequently is started and operated under idle conditions, the torque transmitted through the output gear assembly is relatively low and the spring 66 maintains the sleeve 50 in its aft position. At the same time, the oil pump of the engine lubricating system provides close to its normal operating pressure level, as is the usual practice with internal combustion engines. In this situation the exterior of valve 56 is exposed to pressurized lubricating fluid and the one-way valve 56 permits flow of fluid to the chamber 48 until it is full. During normal operation then, the torque reaction on the lay shaft increases and the sleeve 50 is urged in a forward direction to compress the fluid-filled chamber 48. As soon as the pressure in chamber 48 exceeds the pressure on the exterior of valve 56, further flow of fluid into the chamber 48 is blocked. Any further increase in pressure then reflects the torque output of the engine.

It should be noted that spring 66 exerts a biasing force on the sleeve 50 which affects the relationship of the pressure in chamber 48 to engine torque. The bias of the spring can be easily compensated for because its deflection and the force it exerts against the torque reaction remains essentially constant during engine operation. This is so because the deflection of sleeve 50 is insignificant for the torque variations experienced. In connection with this it is desirable to provide a pressure-indicating device 80 which requires a relatively small displacement of fluid to function. Any displacement of fluid in the device 80 would cause a resultant displacement of sleeve 50 and a change in the force of spring 66.

It is therefore seen that the torque-indicating device 42 automatically replenishes the chamber 48 each time the engine is started up and before normal operation. By automatically replenishing the chamber 48 it is maintained in a condition wherein sufficient fluid is provided to provide an adequate pressure response to variations in torque. This feature additionally enables the torque-indicating device to be used over a relatively longer period of time since any leakage from the chamber 48 by aging of the seal element 76 would be automatically compensated for.

While the illustrated embodiment of the present invention has been described, it will be apparent to those skilled in the art that modifications may be performed without departing from the spirit and scope of the present invention. For example, it is not necessary to use a gear assembly incorporating a displaceable lay shaft to determine torque. The gear assembly need only incorporate an input and output gear with one of the gears displaceable relative to the other.

Accordingly, the invention is to be determined solely by the appended claims.

Having thus described the invention, what is claimed as novel and desired to be secured by Letters Patent of the United States is:

I claim:

1. A torque-indicating device for use with an engine having a rotatable output shaft, said assembly comprising:

an output gear assembly for said engine including intermeshing first and second helical gear means coupled to said output shaft, said first gear means being displaceable relative to the other gear means in response to the torque output of the engine;

means for forming a chamber;

a valve element means having an inner side displaceable into said chamber to form in combination with said chamber means a variable volume and an outer side abutting said first gear means, said valve being displaceable by the first gear means in a direction to reduce the chamber volume in response to an increase in torque;

a pump for pressurizing lubricating fluid for said engine and a means for connecting pressurized lubricating fluid from said pump to the outer side of said displaceable valve element means;

means carried by said displaceable valve element means for permitting one-way flow of fluid from the outer side of said displaceable valve element means to its inner side, thereby maintaining the chamber full of fluid so that when said displaceable valve element is urged by said first gear means towards a reduced volume position the fluid pressure in said chamber is proportional to the torque output of said engine; and means responsive to fluid pressure in said chamber for indicating the torque output of said engine.

2. A torque-indicating device as in claim 1 further comprising:

means for limiting the maximum displacement of said valve element means in a direction which increases chamber volume; and means for biasing said valve element means to said maximum position whereby when the torque output of said engine is low and the pressurized output of said pump is relatively high, fluid in said chamber is automatically replenished.

3. A torque-indicating device as in claim 1 wherein:

said means for forming a chamber comprises a housing having a longitudinal cylindrical bore therein;

said valve element means comprises a cylindrical element displaceable into said bore towards the bottom wall thereof and having an inner side cooperating with said bore to form said variable chamber.

4. A torque-indicating device as in claim 3 further comprising:

means for limiting the maximum displacement of said cylindrical valve element away from the bottom wall of said bore;

means acting on the bottom wall of said bore and the inner side of said valve element for yieldably urging said valve element toward said maximum displacement.

5. A torque-indicating device as in claim 4 wherein:

the output gear assembly of said engine comprises coaxial input and output gears axially spaced from one another defining said second gear means and a lay shaft having a pair of gears fixed with respect to one another defining said first gear means for respectively engaging said input and said output gear, said lay shaft being journaled on an open-ended fixed tubular shaft so that said lay shaft is displaceable in an axial direction in response to the torque output of said engine;

said valve element means and said one-way flow means comprise:

a sleeve displaceable into said bore and telescoped over one end of said tubular shaft, said sleeve having an inner shoulder positioned adjacent its inner end and a flange on its outer end for engaging one end of said lay shaft;

a valve element having a cylindrical base received by the inner shoulder of said sleeve and a generally hemispherical head portion extending through said shoulder and having ports therein for permitting flow of fluid to the inner side of said valve element, and an elastic member for permitting one-way flow of fluid through said ports.

6. Apparatus as in claim 5 wherein said pressurized lubricating fluid connecting means comprises means for providing a flow path from said pump through the interior of said tubular element to the head portion of said valve element.

7. A torque-indicating device as in claim 6 wherein said sleeve has an outer seal element adjacent the inner end of said sleeve and a series of ports positioned towards the outer end of said sleeve for communicating lubricating fluid from the interior side of said tubular shaft for journaling said sleeve element in said bore.